No. 615,952. Patented Dec. 13, 1898.
C. S. BRADLEY.
ALTERNATING CURRENT GENERATOR.
(Application filed July 14, 1897.)
(No Model.)
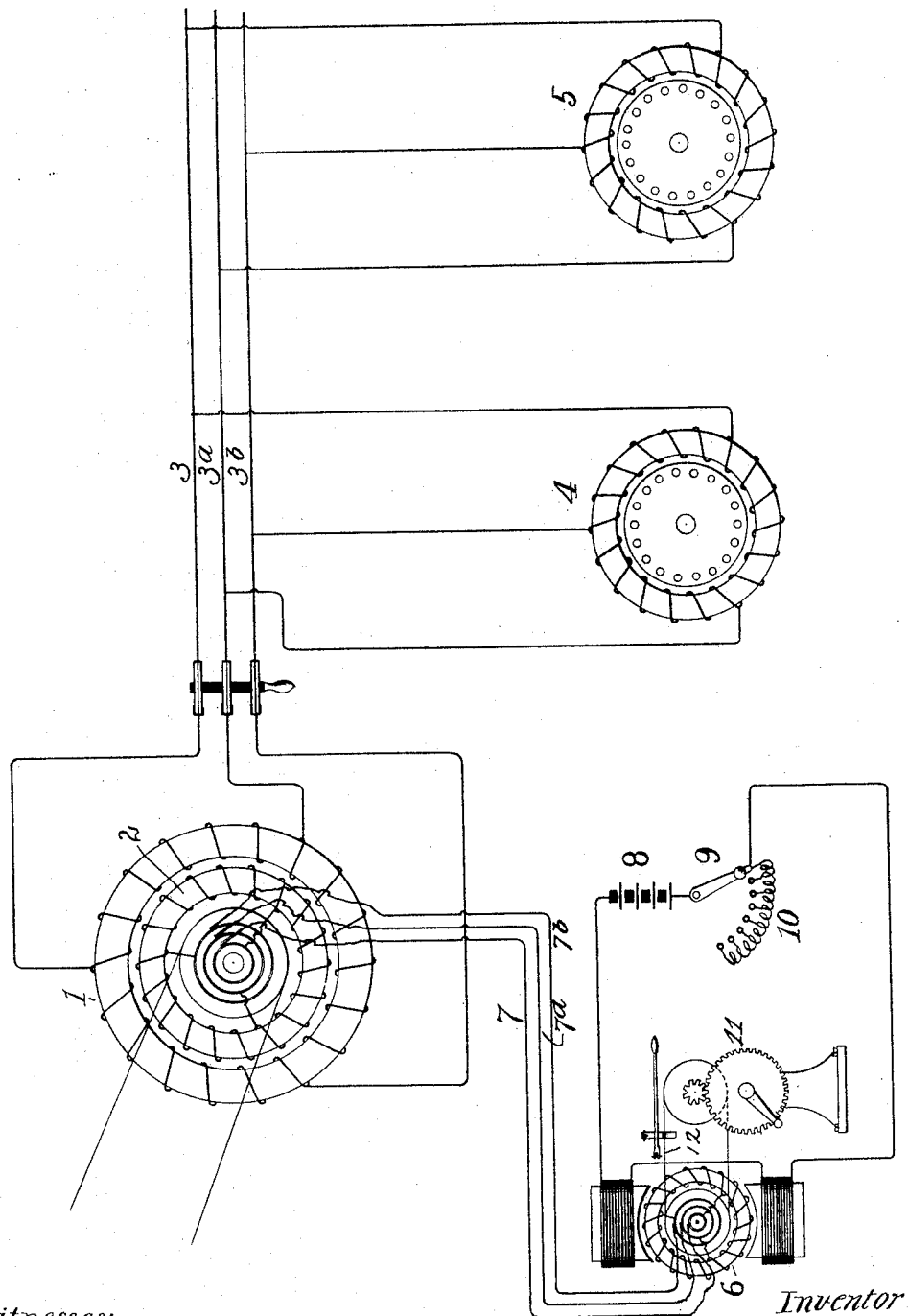
Witnesses:
C. L. Belcher
Elizabeth Ewing
Inventor
Charles S. Bradley
By
Ross & Mead,
his Attorney

UNITED STATES PATENT OFFICE.

CHARLES S. BRADLEY, OF AVON, NEW YORK.

ALTERNATING-CURRENT GENERATOR.

SPECIFICATION forming part of Letters Patent No. 615,952, dated December 13, 1898.

Application filed July 14, 1897. Serial No. 644,475. (No model.)

*To all whom it may concern:*

Be it known that I, CHARLES S. BRADLEY, a citizen of the United States, and a resident of Avon, county of Livingston, and State of New York, have invented certain new and useful Improvements in Alternating-Current Generators, of which the following is a specification.

This invention relates to the generation of alternating currents of variable rate of frequency and electromotive force.

The object of the invention is to operate a group of motors and start and vary the speed of the same without resorting to resistance or other devices in the motor-circuits.

The invention is especially adapted to the operation of railway-trains by alternating currents, where it is desirable that all the motors driving the train should be started and stopped simultaneously.

In carrying out the invention I provide a generator mounted on the train, the primary member of which is excited by an auxiliary machine having a field-magnet charged with direct current, and means for varying the strength of the field-magnet charge. The secondary member of the generator is connected with a work-circuit supplying the several motors of the train, which may be induction-motors. By reason of the exciter having a variable direct-charged field-magnet the exciting-circuit may be rendered resonant, an exciter of the type described acting in an equivalent manner to a condenser and tending with a stiff field to cause a lead in phase in a circuit in which it is inserted. The armature of the generator may be driven at a constant or practically constant speed by a prime mover, and the speed of rotary poles may be rendered variable by a variation of strength of the field-magnet of the exciter. The rotary poles developed in the primary core of the generator are given an opposite direction of travel to the core itself, and when there is a difference of speed of the poles and core, respectively, currents of variable frequency will be supplied to the work-circuit, a low frequency being imposed upon the work-circuit when the motors are starting and a higher frequency as an acceleration of speed is required.

The invention comprises an alternating-current generator having one element excited by a machine the armature of which is adapted to receive and deliver alternating currents and the field-magnet of which is excited by a direct current of variable strength, the other element of which supplies a work-circuit, including alternating-current motors.

In the accompanying diagram, illustrating the invention, 2 represents the primary of an alternating-current generator, the secondary winding 1 of which is connected at a plurality of symmetrically-distributed points with a work-circuit 3 $3^a$ $3^b$, including any number of induction or other motors, such as 4 5. The prime mover may be a steam-engine or turbine or other local source of power mounted on the train. The primary winding connects with a polyphase-exciter, the currents from which set up a rotary magnetic field in the primary core. The exciter is provided with a driven member 6, arranged to be operated, when starting, by a starting device 11, acting on a belt 12, a fast and loose pulley and belt-shifter being provided. The exciter-armature is tapped at a plurality of symmetrically-distributed points and connects through brushes with the leads 7 $7^a$ $7^b$, extending to the primary member of the generator. The field-magnet of the exciter is charged by a source of direct current 8, a switch and variable resistance 9 10 being included in the circuit, by which the field-magnetism of the exciter may be varied in strength.

The operation of the system is as follows: The generator may be started up by the prime mover and the exciter then driven by connecting its operating-belt with the tight pulley and operating the hand-operated starting device. The order of connection of the exciter-leads 7 $7^a$ $7^b$ is such as to develop a pole rotation in the primary member 2 in an opposite direction to the core movement of said member. The switch 9 should be adjusted in starting to cut in the resistance 10 and give a comparatively weak field-magnet charge to the exciter, thus giving a high rate of alternation to the rotary poles of the primary member 2 and producing a slow rate of alternation in the work-circuit 3 $3^a$ $3^b$. This will be readily understood from the fact that when the rotary poles and core of the element 2 move at the same speed the magnetic field of force is stationary relatively to the secondary generator-winding. Since this rate of alternation is dependent upon the speed of the primary poles relatively to the secondary winding and since the movement of the poles in the core and the bodily movement of the core are in opposite directions, the speed of cutting of the secondary winding is a differential result, being greater the larger the difference of speed of the core and rotary primary poles, respectively. The motors 4 5 start with strong torque under the low rate of alternation, and after acquiring partial speed the rate of alternation in the work-circuit may be increased by increasing the field-magnet strength of the exciter, and thereby slowing down the speed of the rotary field of the primary element 2. After the generator has once been put into operation the exciter may be permitted to run free by shifting its belt to the loose pulley and will assume different speeds for different field-magnet adjustments by the switch 9, such speed being dependent on the static capacity or condenser effect which any adjustment represents relatively to the inductance of the generator-primary and its exciting-circuit.

Having thus described my invention, what I claim as new, and desire to secure by Letters Patent, is—

1. An alternating-current system comprising a generator operated by a prime mover, an exciter for developing a rotary field in the primary member of said generator, said exciter having its field-magnet charged by a direct current of variable intensity, and a work-circuit supplied by the secondary of said generator.

2. An alternating-current generator having one member excited by a free-running dynamo-electric machine whose field-magnet is charged by a direct current of variable strength.

3. An alternating-current generator having one member excited by a free-running dynamo-electric machine whose field-magnet is charged by a direct current of variable strength, and means for starting the free-running machine.

In testimony whereof I have hereunto subscribed my name this 21st day of June, A. D. 1897.

CHARLES S. BRADLEY.

Witnesses:
C. R. WATERBURY,
ROBT. H. READ.